April 3, 1928.　　　　　C. P. MAYER　　　　　1,665,141

FLOW METER

Filed Feb. 9, 1927

WITNESSES
H. J. Walker
Franklin J. Foster

INVENTOR
C. P. Mayer
BY
ATTORNEY

Patented Apr. 3, 1928.

1,665,141

UNITED STATES PATENT OFFICE.

CHARLES PETER MAYER, OF ELIZABETH, NEW JERSEY.

FLOW METER.

Application filed February 9, 1927. Serial No. 166,994.

The present invention is concerned with the provision of a novel meter for measuring the rate of flow of fluid streams.

An object of the invention is to provide a simple device of this character, sensitive to extremely low rates of flow and accurately measuring a wide range of flow rates.

Preferably the device includes an impelled member in the nature of a multiple-bladed low pitched screw which is mounted in the path of a flowing fluid stream, and which is quite sensitive to the rate of flow. This screw is preferably connected to a shaft acting directly on a registering or recording mechanism, the impelled member at low flow rates being opposed by an extremely sensitive spring.

Preferably also, the relatively light sensitive spring is supplemented at higher rates of flow by a heavier spring, so that accurate measurements may be had at all rates of flow.

Other objects of the invention are to provide a meter of this character, of simple, practical construction, which will be rugged, durable and efficient in use, and comparatively inexpensive to manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
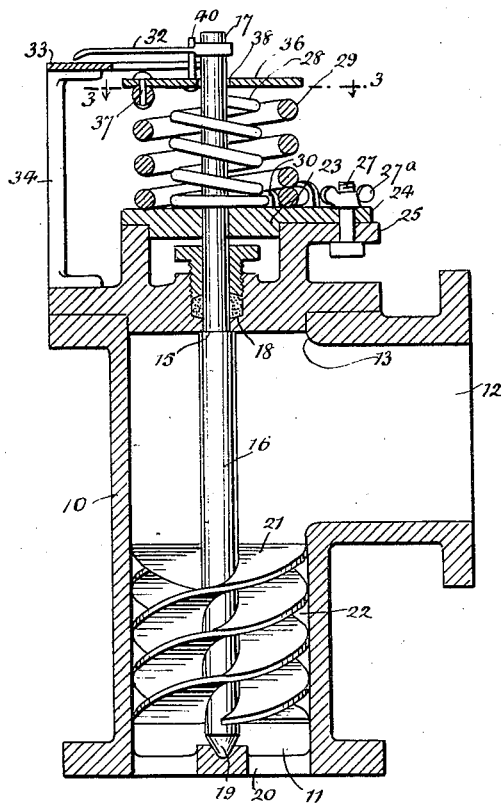
Fig. 1 is a view in longitudinal section through a meter embodying the present invention.
Figure 2:
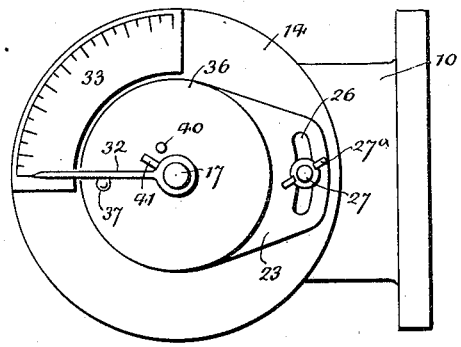
Fig. 2 is a top plan view thereof.
Figure 3:
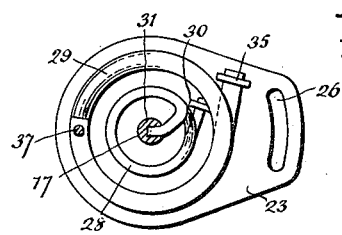
Fig. 3 is a sectional plan view on the line 3—3 of Fig. 1.

In the drawings I have shown a substantially L-shaped casing 10 having an open end 11 through which the fluid enters, and an open end 12 through which the fluid escapes. Opposite the end 11 of the casing there is provded another opening 13 normally closed by a flanged cap member 14 seating on the casing 10 and abutting against a shoulder 15 on a shaft 16. The reduced end 17 of the shaft 16 extends upwardly through the cap 14 and through suitable packing material 18 associated with the cap. The opposite end of the shaft 16 is tapered at 19 and mounted in a spider 20 arranged in the open end 11 of the casing 10. Shaft 16 is thus confined against axial movement by the cap 14 and the spider 20, and is bored in the cap and spider for free rotatable movement. The lower end of the shaft 16 carries a triple bladed screw 21 arranged to fit the vertical passageway 22 of the L-shaped casing. I find that the triple bladed arrangement offers the proper amount of surface to render the screw sensitive to fluid flowing through the casing 10, although other multi-bladed screws might be used. Preferably the pitch of the screw is such that a complete revolution of a blade about the shaft carries the blade longitudinally a distance approximately equivalent to the diameter of the blade.

Rotatably mounted on top of the cap 14 is a disc 23, this disc including a lateral extension 24 overlying a similar extension 25 on the cap. Extensions 24 and 25 are provided with aligned arcuate slots 26, and a screw 27 passed through the aligned slots carries a wing nut 27ª which when tightened prevents rotation of the disc 23 relatively to the cap 14.

Disc 23 serves to anchor the lower ends of two concentric spirally coiled springs 28 and 29. Spring 28 has one end anchored to the disc 23 as at 30, and its upper end anchored to the shaft extension 17 as at 31. This relatively light spring opposes rotation of the shaft under the impetus which may be imparted to the screw by the fluid striking thereagainst.

The upper end of the shaft 17 carries an indicating finger 32 cooperating with the scale plate 33 mounted on a bracket 34 rising from the flange of the cap 14.

The outer relatively heavy spring 29 is anchored at one end to the disc 23 as at 35, and at its other end to the under face of a disc 36 as at 37. Disc 36 has a central opening 38 through which the shaft end 17 freely passes and is disposed below the indicating finger 32. A lost motion connection is provided between this floating disc and the shaft 17, this lost motion connection comprising a pin 40 rising from the disc 36 and disposed in the path of a pin or lug 41 carried by the shaft 17.

The disc 36 is normally supported by the coiled spring 29, and the tension of the two springs may be simultaneously adjusted by rotating the disc 36 and clamping the wing nut 27ª in nut clamping position.

In operation, fluids flowing at a low rate through the passage 22, impinge against the impelled member or screw 21, slightly rotating the shaft 16 against the action of the relatively light coiled spring 28. The heavy spring 29 is not brought into action until a substantial torque has been exerted on the shaft 16 by the rate of flow of the gas passing through the casing 10. As the flow rate increases, the heavier spring is brought into play, and the two springs cooperatively resist rotation of the shaft 16 so that the graduations on the scale plate may be substantially uniform distances apart.

Obviously various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A casing having a passageway therein through which a fluid is adapted to flow and means for measuring the rate of such flow, including a shaft extending longitudinally of the passage, an impelled member on the shaft acted on by the flowing fluid to turn the shaft, spring means opposing the turning movement of the shaft, a scale member, a cooperating indicating member carried by the shaft, said impelled member comprising a triple bladed screw of a pitch approximately equal to its diameter carried by the shaft.

2. A casing having a passageway therein through which a fluid is adapted to flow and means for measuring the rate of such flow, including a shaft extending longitudinally of the passage, an impelled member on the shaft acted on by the flowing fluid to turn the shaft, spring means opposing the turning movement of the shaft, a scale member, a cooperating indicating member carried by the shaft, the spring means including a spiral torsional spring, anchored at one end to the shaft, and a rotatably adjustable spring tensioning plate to which the other end of the spring is anchored.

3. A casing having a passageway therein through which a fluid is adapted to flow and means for measuring the rate of such flow, including a shaft extending longitudinally of the passage, an impelled member on the shaft acted on by the flowing fluid to turn the shaft, spring means opposing the turning movement of the shaft, a scale member, a cooperating indicating member carried by the shaft, said spring means including a relatively light coiled torsional spring and a relatively heavy coiled torsional spring, and lost motion connections between said shaft and said heavy spring.

4. A casing having a passageway therein through which a fluid is adapted to flow and means for measuring the rate of such flow, including a shaft extending longitudinally of the passage, an impelled member on the shaft acted on by the flowing fluid to turn the shaft, spring means opposing the turning movement of the shaft, a scale member, a cooperating indicating member carried by the shaft, said spring means including a relatively light coiled torsional spring and a relatively heavy coiled torsional spring, a rotatively adjustable spring tensioning plate to which one end of each spring is anchored, the light spring being anchored at its other end to the shaft, and a floating disc on the shaft anchoring the other end of the heavy spring, and free for limited rotary movement on the shaft whereby a lost motion connection is provided by the shaft and disc.

5. A casing having a passageway therein through which a fluid is adapted to flow and means for measuring the rate of such flow, including a shaft extending longitudinally of the passage, an impelled member on the shaft acted on by the flowing fluid to turn the shaft, spring means opposing the turning movement of the shaft, a scale member, a cooperating indicating member carried by the shaft, said spring means including a relatively light coiled torsional spring and a relatively heavy coiled torsional spring, a rotatively adjustable spring tensioning plate to which one end of each spring is anchored, the light spring being anchored at its other end to the shaft, and a floating disc on the shaft anchoring the other end of the heavy spring, said floating disc and shaft including interengaging elements providing lost motion connections.

CHARLES PETER MAYER.